United States Patent
Clayton et al.

[15] 3,682,028
[45] Aug. 8, 1972

[54] HIGHLY PERMEABLE THERMOPLASTIC FILM PERFORATING

[72] Inventors: William J. Clayton, Fairport; Charles D. Keyser, Gorham, both of N.Y.

[73] Assignee: Mobil Oil Corporation

[22] Filed: June 18, 1970

[21] Appl. No.: 47,407

[52] U.S. Cl. ..............................83/30, 83/14, 83/54, 83/116, 83/345, 83/660
[51] Int. Cl. ..............................................B26f 1/24
[58] Field of Search........83/659, 114, 117, 678, 476, 83/456, 430, 14, 345, 30, 54, 660, 116

[56] References Cited

UNITED STATES PATENTS

| | | | |
|---|---|---|---|
| 244,845 | 7/1881 | Bowles | 83/117 |
| 3,355,974 | 12/1967 | Carmichael | 83/660 X |
| 2,673,740 | 3/1954 | Hutt | 83/660 X |
| 1,726,611 | 9/1929 | Cook | 83/660 X |
| 2,753,001 | 7/1956 | Page | 83/30 X |
| 3,407,691 | 10/1968 | Schlesinger | 83/345 X |
| 3,538,797 | 11/1970 | Wagtskjold | 83/660 X |

*Primary Examiner*—Frank T. Yost
*Attorney*—Oswald G. Hayes, Andrew L. Gaboriault and James D. Tierney

[57] ABSTRACT

The present invention relates to highly permeable film products and a method for the production of such products comprising continuously passing relatively unpermeable, unperforated film stock through the nip of a pair of counter-rotating rollers. One of the rollers, i.e. a perforating roller, is provided around the circumference thereof, with a plurality of relatively dull needles or brads which serve to puncture the film as it passes through the nip formed by the perforating roller and a second back-up roller. As the film is being perforated it is firmly anchored and supported in a transverse direction by both the back-up roller and a resilient elastomeric material positioned around the periphery of the perforating roller, whereby efficient and positive film perforation is achieved at high film throughput rates.

4 Claims, 5 Drawing Figures

PATENTED AUG 8 1972 3,682,028

Inventors
William J. Clayton
Charles D. Keyser

Inventors
William J. Clayton
Charles D. Keyser

HIGHLY PERMEABLE THERMOPLASTIC FILM PERFORATING

BACKGROUND OF THE INVENTION

1. Field of the Invention

The invention is directed to an improved method for employment in the manufacture of permeable films which have high moisture vapor and gas transmission ratios and which are resistant to the transmission of liquids or solids therethrough. Such permeable film products have numerous end use applications, such as for example, in the fabrication of bags or overwrap film material suitable for the packaging of moisture-emitting fresh produce or meat products. Other applications for such permeable films include garment bags, clothing such as raincoats, filters, construction film, upholstery coverings and many others.

More particularly, the present invention is concerned with a method for the treatment of film, and in particular, multiple layers thereof including flattened lay-flat tubing or flattened gussetted tubing in such a manner as to greatly increase the permeability thereof. Although for purposes of the following description of applicants' invention, specific reference is made to perforating films such as thermoplastic films, including polyolefins such as polyethylene, it will be understood that the present method may be used with wide varieties of films, including metallic foils, e.g. aluminum foil; paper, rubber and thin thermosetting films such as phenolics, for example. This may be accomplished, in accord with one embodiment of the precess of the present invention, by forming holes or perforations in selected areas or throughout the total surface area being treated by subjecting the film to the pressure application of a perforating roller characterized by having a plurality of relatively sharp protruding needles or brads located around its periphery. Perforation of the film layers by the perforating roller is accomplished by pressing the film into contact with the rotating perforating roller utilizing a back-up roller positioned in nipping engagement with the perforating roller. The back-up roller is characterized by having a plurality of annular grooves around its circumference which serve to accommodate the perforating needles after they have punctured the film. Ridges are located adjacent opposite sides of each annular groove on the back-up roller which serve to anchor and firmly position the film as it is being penetrated with the needles of the perforating roller.

2. Description of the Prior Art

In the past, numerous methods have been proposed for the production of films which have been perforated to increase their permeability to gases and/or vapors while restricting the passage of liquids or solids therethrough. U.S. Pat. No. 3,227,854 describes a technique for perforating relatively thin thermoplastic film materials while passing a continuous single layer of film into the nip formed by a pair of rotating rollers. One of the rollers, i.e. the perforating roller, has a plurality of circumferentially spaced rows of longitudinally aligned and longitudinally spaced film perforating pins which are heated. The heated pins project radially from the periphery of this roll. The roller that supports the film as it is being perforated is characterized by having a series of longitudinally extending grooves, and ridges intermediate the grooves, located around its periphery. The film is perforated by passage thereof through these rollers which are in nipping engagement.

The film is supported by the grooved film support roller as the heated needles on the perforating roller penetrate the film. It has been found, however, that when attempts to perforate multiple layers of film, such as a flattened tube for example, utilizing the process as disclosed in U.S. Pat. No. 3,227,854, such process being particularly characterized in the utilization of heated needle members to effect film perforating, the individual film layers become welded together by virtue of the heated needles fusing the peripheries of the individual superposed holes formed in the film layers by the hot needles. Therefore, it becomes unfeasible to attempt to convert such a perforated multilayer film product into, for example, a bag structure since the film layers which would constitute the bag walls are not separable but are welded tightly together as a result of the aforedescribed hot needle perforating technique. Conversely, when employing applicants' process which is characterized by the employment of cold needles to effect perforation of a flattened tube or multiple film layers, the film layers may be perforated and subsequent to perforation, the layers of film are easily separated to permit ease of fabrication of such film materials into for example, bag structures.

Summary of the Invention

In accordance with the present invention, there is provided a method for perforating either single or multiple layers of thermoplastic film which comprises continuously advancing a length of film into the nip formed by a pair of counter-rotating rollers. One of said rollers, i.e. the perforating roller, is characterized by having a plurality of projecting needles or brads around its periphery and, additionally, the perforating roller is provided around the surface thereof with a covering of elastomeric material. The perforating members may be positioned below the surface of the elastomeric covering of the perforating roller or preferably the perforating members may extend completely through and project slightly beyond the outer surface of the covering, when the covering is in a non-compressed condition. The second roller, i.e. the back-up or film support roller, is provided on its outer surface with a plurality of grooves. The grooves may extend either in a direction parallel with the longitudinal axis of the film support roller or, conversely, the grooves may be annular i.e. encircling the circumference of the roller. These grooves serve to accommodate the perforating members of the perforating roller subsequent to the penetration of said members through the thermoplastic film.

Immediately adjacent each of the grooves on the film support roller there are non-resilient ridges. The clamping action on the film, exerted by the non-resilient ridges on the back-up roller, in combination with the elastomeric material on the perforating roller serve to positively support the film in the transverse direction as it is being perforated. This constitutes an essential part of the method of applicants' invention and allows for uniformly reliable film perforation at commercially acceptable operating speeds. Machine direction, i.e. in a longitudinal direction, film support is primarily provided by the applied longitudinal tension on the continuous web as it is passed into the perforating nip. This tension obviously may be controlled by control of the rate of film supply to the perforating nip and perforated film take-up away from the nip. In the absence of the aforedescribed tensioning arrangement, provided by the present method, the film or film layers would necessarily be simply forced by the perforating brads into the grooves of the back-up roller without effecting the requisite penetration of the film or film layers.

DESCRIPTION OF THE DRAWINGS

FIG. 4 is a fragmentary, front-elevational view taken on line 4—4 of FIG. 4.a.

FIG. 4.a is a sectional view of a portion of the nip formed by rollers 13 and 14.

DESCRIPTION OF SPECIFIC EMBODIMENTS

Figure 1:
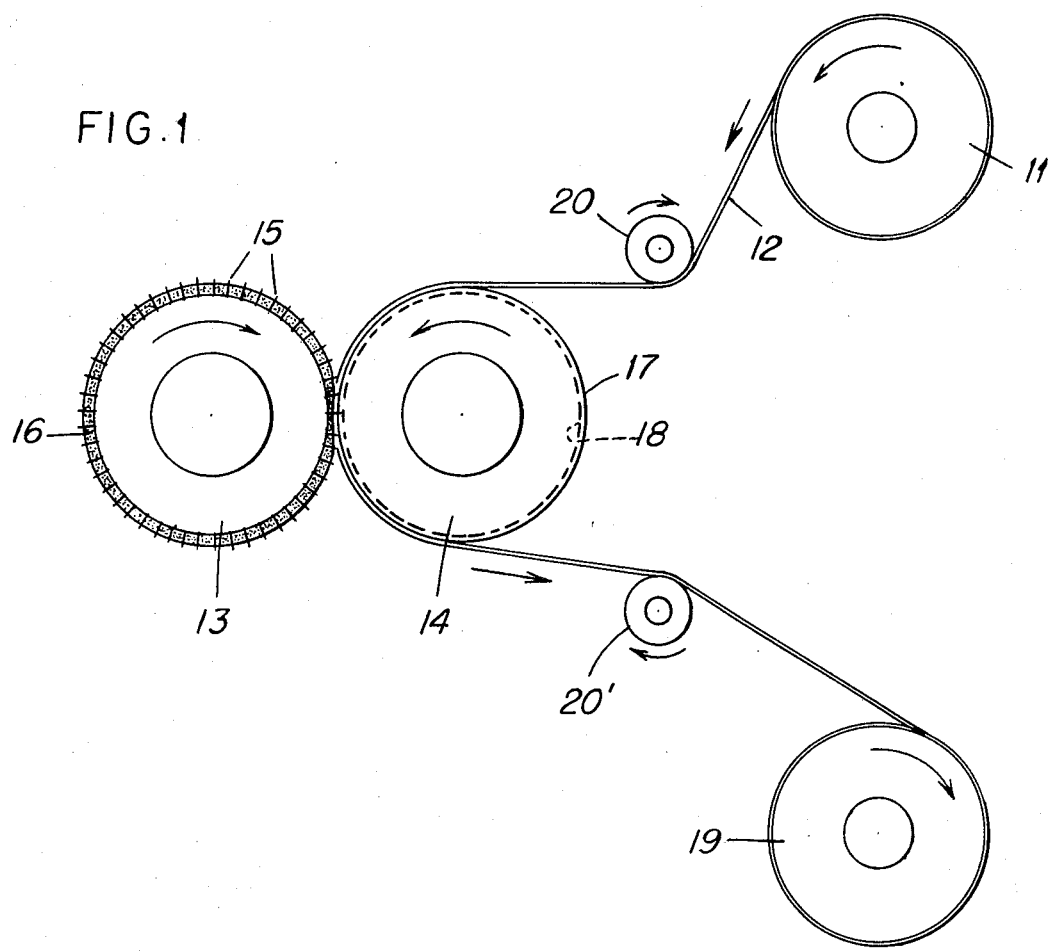
FIG. 1 is a diagramatic view of one form of apparatus which may be employed in the method of the present invention.

As illustrated in FIG. 1, flattened thermoplastic tubular film stock 12 was fed from supply roller 11, over idler roll 20 and into the nip formed by perforating roller 13 and film support roller 14. The over all thickness of the flattened tubular film 12 was about 2 mils, each film layer being about 1 mil thick. As the perforated tubular stock emerged from the nip, it was passed over idler roll 20' and taken up on roller 19, or conversely, the perforated tubular stock 12 may be fed to a subsequent in-line bag forming operation (not shown).

Figure 2:
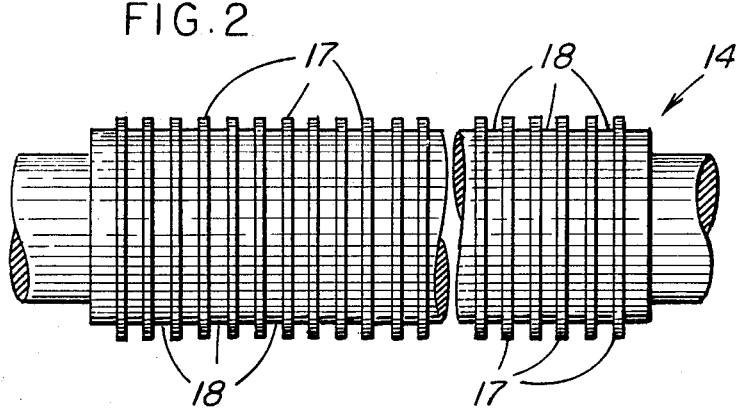
FIG. 2 is a perspective view of the film support roller illustrated in FIG. 1.

As shown in FIG. 2, film support roller 14 was a 3-inch diameter aluminum roll with ⅛-inch wide non-resilient ridges 17 spaced one-quarter inch apart. Intermediate ridges 17 were perforating member accommodating grooves 18, as more clearly illustrated in FIG. 3. Grooves 18 are approximately three-sixteenth inches deep.

Figure 3:
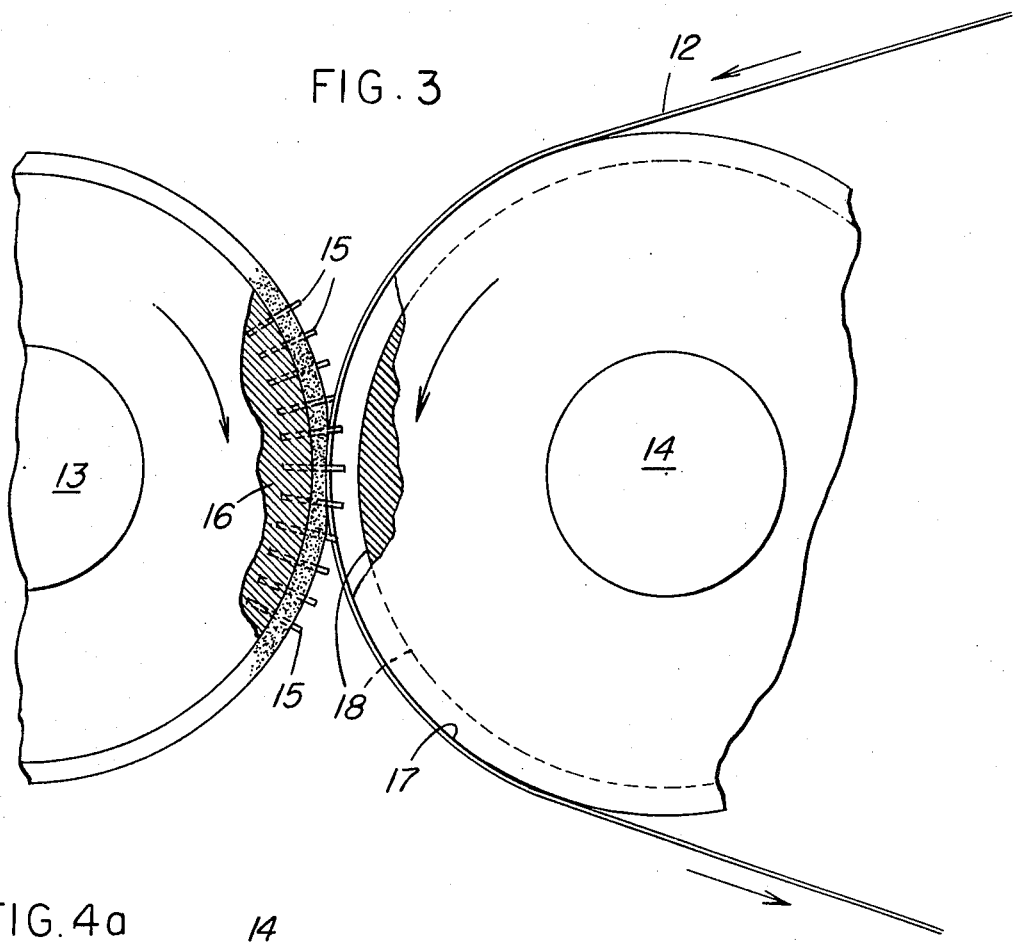
FIG. 3 is a cross-sectional, fragmentary view of a portion of the nip formed by rollers 13 and 14 illustrated in FIG. 1.
Figure 4A:
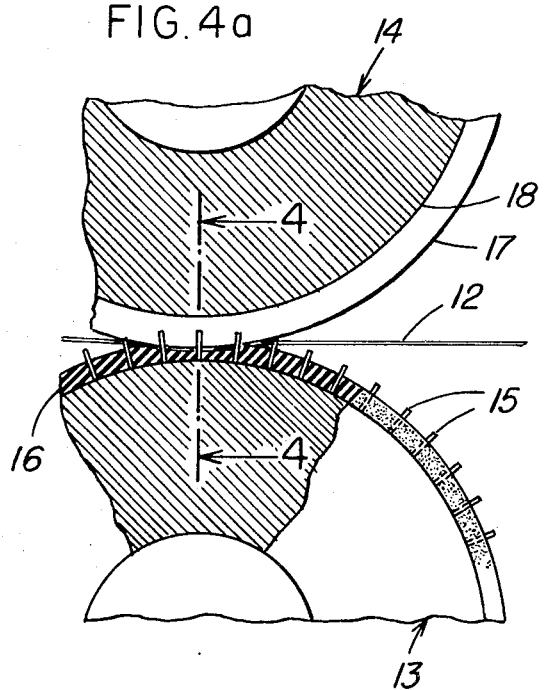
Figure 4:
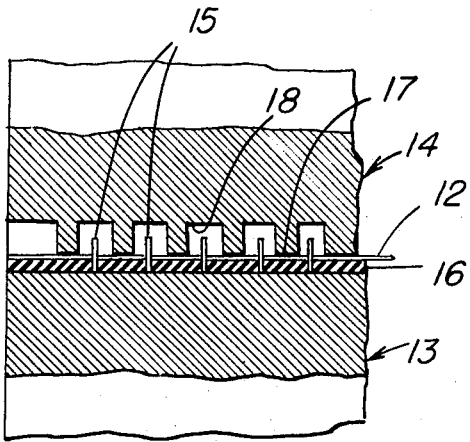

As illustrated in FIGS. 3 and 4, perforating roller 13 was fitted with wire brad perforating members 15, imbedded in perforating roller 13, and extending from the surface of perforating roller 13 approximately three-sixteenth of an inch. The perforating members 15 were spaced about three-sixteenth of an inch apart and arranged annularly around the circumference of perforating roller 13 and positioned so that when rollers 13 and 14 are in operative pressure engagement as illustrated in FIG. 1, members 15 protrude into grooves 18. As shown in FIG. 3 a ⅛-inch thick sponge (neoprene) 16 of medium density, approximately 12 lbs. per cubic foot, was positioned on the surface of perforating roller 13 and bonded thereto. The relatively dull points of the penetrating members 15 protruded above the outer surface of sponge layer 16 approximately one-sixteenth inch.

As flattened tubular film stock 12 was passed from supply roller 11, over idler roll 20 and into the nip formed by counter-rotating roller 13 and 14, the flattened tubular film stock 12 was supported by ridge members 17 on film support roller 14, as film 12 was being punctured by penetrating members 15. As the individual penetrating members 15 passed through the nip, sponge 16, surrounding the penetrating members 15, was compressed by ridges 17 on support roller 14, whereby more than one-sixteenth inch of penetrating member 15 was exposed to allow for complete penetration thereof through the flattened tubular stock 12. As the penetrating member 15 passed through the flattened tubular stock 12, the penetrating member protruded into groove 18 intermediate ridges 17 on film support roller 14 whereby the point of the penetrating member 15 did not contact any part of the surface of film support roller 14 during the perforating process.

During penetration of members 15 through film layers 12, the resilient sponge material 16 surrounding penetrating members 15 firmly holds film layers 12 under transverse tension to allow efficient perforation of the film layers. Longitudinal tensioning of the film is achieved by maintaining sufficient tension on film 12 through regulation of the rate of film supply from roller 11 and perforated film take-up on roller 19.

It was found that when attempts were made to perforate thermoplastic film or multiple layers thereof without employing resilient covering 16 on roller 13, film 12 had an undesirable tendency to sag into grooves 18 thereby making efficient film penetration by members 15 impossible.

When employing the perforating method of the present invention utilizing commercially acceptable film throughput rates on the order of from about 25 ft./min. to about 500 ft./min., as a result of the film tensioning during the perforation operation, the relatively dull penetrating members 15 produce uniformly round holes or perforations in the film layers. Since the individual penetrating members 15 do not progressively rupture the film layers, discs of film material corresponding in size to the size of the perforation or hole made in the film are cut out from the film layers during the perforating operation. Such a process differs from, for example, the prior art techniques utilizing heated penetrating members to effect penetration of film layers and as previously discussed, resulted in undesirable welding together of the individual film layers. Additionally, the method of the present invention is superior to, for example, the employment of cold sharp needle members to perforate the film since, in addition to the absence of proper film tensioning as taught by the present invention, in such a process the sharp pointed penetrating members do not result in the production of uniformly round perforations in the film, but rather leave a jagged remnant of film around the non-uniform periphery of such perforations which makes this type of perforated material more susceptible to rupturing and tearing when forces are applied thereto, such as impact forces which may be encountered when such film materials are subjected to normal handling or when such film materials are employed as overwrap materials or fabricated into bag structures.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A continuous method for the production of perforated film material which comprises continuously advancing a film and (a) contacting one surface of said continually advancing film with a plurality of film penetrating members while simultaneously supporting the opposite surface of said film on a plurality of nonresilient, parallel ridges, said ridges being separated by grooves; (b) puncturing said film by pressure contact thereof with said penetrating members while simultaneously tensioning said film, in a direction transverse to the path of movement of said film, with an elastomeric material that completely surrounds, and is located immediately adjacent to, each of said film penetrating members.

2. A method in accordance with claim 1 wherein said film material is thermoplastic.

3. A method in accordance with claim 1 wherein said film material is polyethylene.

4. A method in accordance with claim 1 wherein said film material comprises at least two layers of film.

* * * * *